United States Patent
Spitzenberger

(10) Patent No.: US 9,132,489 B2
(45) Date of Patent: Sep. 15, 2015

(54) MILLING CUTTER AND A CUTTING INSERT THEREFOR

(71) Applicant: Kennametal Inc., Latrobe, PA (US)

(72) Inventor: Konrad Spitzenberger, Fürth (DE)

(73) Assignee: KENNAMETAL INC, Latrobe, PA (US)

(*) Notice: Subject to any disclaimer, the term of this patent is extended or adjusted under 35 U.S.C. 154(b) by 209 days.

(21) Appl. No.: 13/855,823

(22) Filed: Apr. 3, 2013

(65) Prior Publication Data

US 2013/0236261 A1 Sep. 12, 2013

Related U.S. Application Data

(60) Division of application No. 12/120,671, filed on May 15, 2008, now Pat. No. 8,434,974, and a continuation-in-part of application No. PCT/EP2006/010696, filed on Nov. 8, 2006.

(51) Int. Cl.
*B23C 5/20* (2006.01)

(52) U.S. Cl.
CPC .................. *B23C 5/207* (2013.01); *B23C 5/202* (2013.01); *B23B 2200/369* (2013.01); *B23B 2220/445* (2013.01); *B23C 2200/085* (2013.01); *B23C 2200/205* (2013.01); *B23C 2200/208* (2013.01); *B23C 2200/367* (2013.01); *Y10T 407/195* (2015.01); *Y10T 407/196* (2015.01); *Y10T 407/1924* (2015.01); *Y10T 407/1942* (2015.01); *Y10T 407/23* (2015.01); *Y10T 409/303752* (2015.01)

(58) Field of Classification Search
CPC .................. Y10T 407/1904; Y10T 407/1924; Y10T 407/1962; Y10T 407/23; Y10T 409/303752; Y10T 409/303808; B23C 5/202; B23C 5/207; B23C 2200/208; B23B 2220/445
USPC .................. 409/131, 132; 407/34, 42, 61, 113
See application file for complete search history.

(56) References Cited

U.S. PATENT DOCUMENTS

| | | |
|---|---|---|
| 3,490,117 A | 1/1970 | Hertel |
| 4,294,566 A | 10/1981 | Boone |
| 4,539,875 A | 9/1985 | Lee et al. |
| 4,597,695 A | 7/1986 | Johnson |

(Continued)

FOREIGN PATENT DOCUMENTS

| | | |
|---|---|---|
| DE | 203 13 042 | 10/2003 |
| EP | 0 313 534 | 4/1989 |

(Continued)

*Primary Examiner* — Daniel Howell
*Assistant Examiner* — Michael Vitale
(74) *Attorney, Agent, or Firm* — Larry R. Meenan

(57) ABSTRACT

A method of machining a workpiece using a rotary milling cutter is disclosed. The method includes rotating a tool head with a shaft, rough cutting a workpiece with a rough cutting edge of a first partial body to remove a first amount of material from the workpiece, and finish cutting a rough-cut surface of the workpiece with a finishing edge of a second partial body to remove a second amount of material from the workpiece, the second amount of material being smaller than the first amount of material. Both the rough cutting edge of the first partial body and the finishing edge of the second partial body simultaneously engage the workpiece to perform both rough cutting and said finish cutting of the workpiece in a single cutting operation.

5 Claims, 6 Drawing Sheets

(56) References Cited

U.S. PATENT DOCUMENTS

| | | | |
|---|---|---|---|
| 4,990,036 A | | 2/1991 | Eklund et al. |
| 5,114,282 A | * | 5/1992 | Pawlik .......................... 407/40 |
| 6,835,028 B2 | | 12/2004 | Usui et al. |
| 6,913,424 B2 | | 7/2005 | Yoshihiro et al. |
| 2004/0013478 A1 | * | 1/2004 | Dehn et al. .................... 407/113 |

FOREIGN PATENT DOCUMENTS

| | | | |
|---|---|---|---|
| JP | 01-321101 | | 12/1989 |
| JP | 2002066811 A | * | 3/2002 |
| JP | 2004314301 A | * | 11/2004 |

* cited by examiner

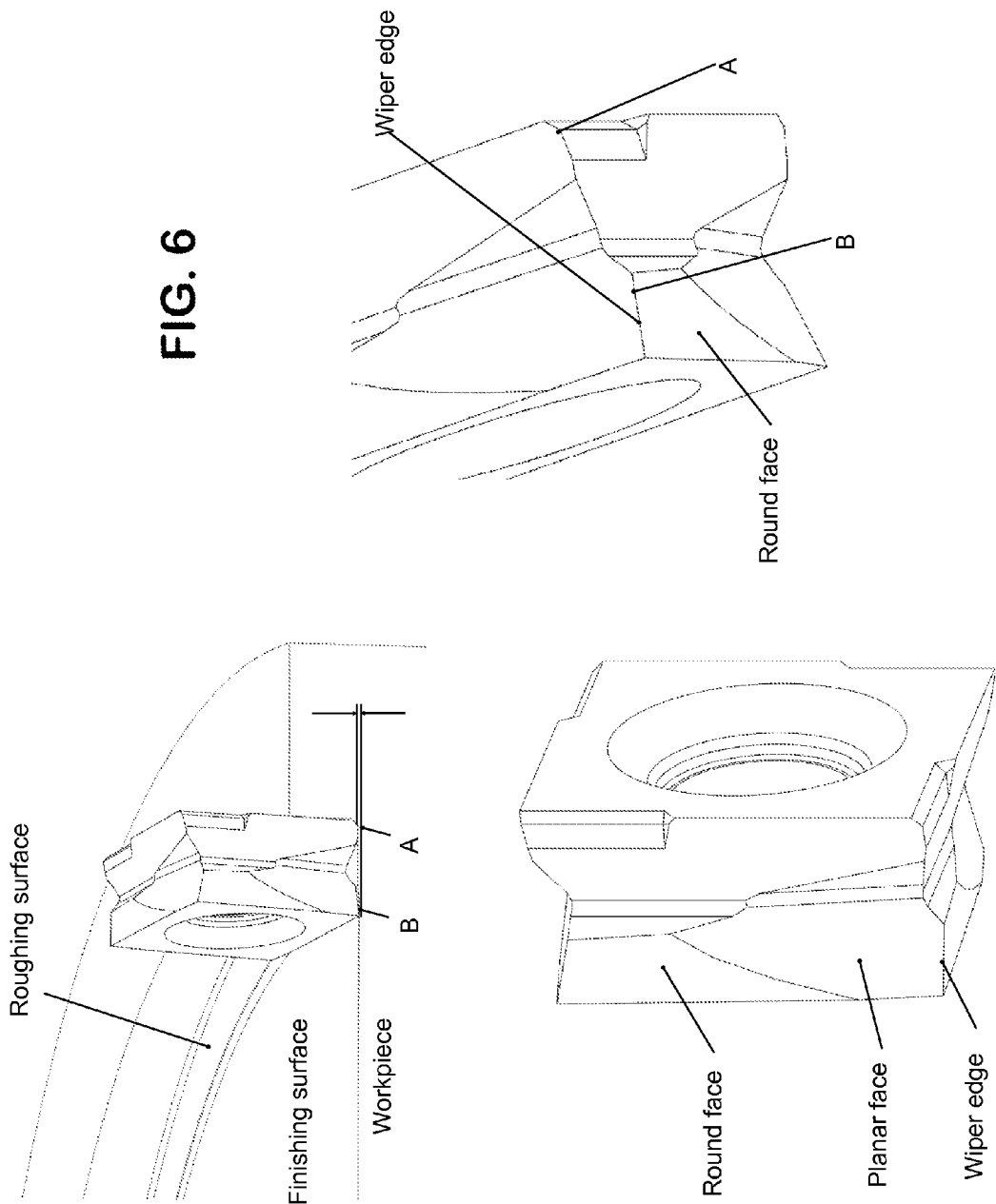

MILLING CUTTER AND A CUTTING INSERT THEREFOR

This application is a divisional application of application Ser. No. 12/120,671, filed on May 15, 2008, which is a Continuation-In-Part application of International Patent Application No. PCT/EP2006/010696, filed on Nov. 8, 2006, which claims priority from Federal Republic of Germany Patent Application No. 10 2005 054 434.7, filed on Nov. 15, 2005, the entire contents of all these application are incorporated herein by reference.

BACKGROUND

1. Technical Field

This application relates to a milling cutter and an indexable insert with two partial bodies, which merge into one another and which have a polygonal base, but are rotated toward one another.

2. Background Information

German patent application published for opposition, No. 1 232 436, discloses an indexable insert whose base is in each case, for example, a square which offers the possibility to form eight cutting edges. By arranging the two partial bodies rotated toward one another, the cutting edges can be adjusted in the desired geometry.

OBJECT OR OBJECTS

At least one possible object of the present application is to describe a milling cutter and an indexable insert therefor which provide substantially simultaneous rough and smooth machining or cutting of a workpiece.

SUMMARY

To achieve this object, it is provided according to the invention that one partial body has a number of roughing edges and the other partial body, a number of finishing edges, which are arranged in such a manner that a roughing edge of a partial body and a finishing edge of the other partial body can simultaneously act upon a workpiece. At least one possible embodiment is based on the knowledge that different cutting edges can be provided on the same indexable insert in such a manner that the workpiece can be roughed and finished in one operation. It is not necessary to re-adjust the indexable insert for this purpose as both the roughing edges and the finishing edges are configured with the rake angle suitable for the corresponding machining operation. This is possible without problems because the respective roughing and finishing edges used simultaneously are provided on different partial bodies of the indexable insert and can, therefore, be designed independently of one another.

In general, each partial body can be any n-angled surface, n being any natural number.

Additional possible embodiments and features thereof are disclosed herein below.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

FIG. 6 shows additional three-dimensional views of at least one possible embodiment of the indexable insert.

DESCRIPTION OF EMBODIMENT OR EMBODIMENTS

Figure 1:
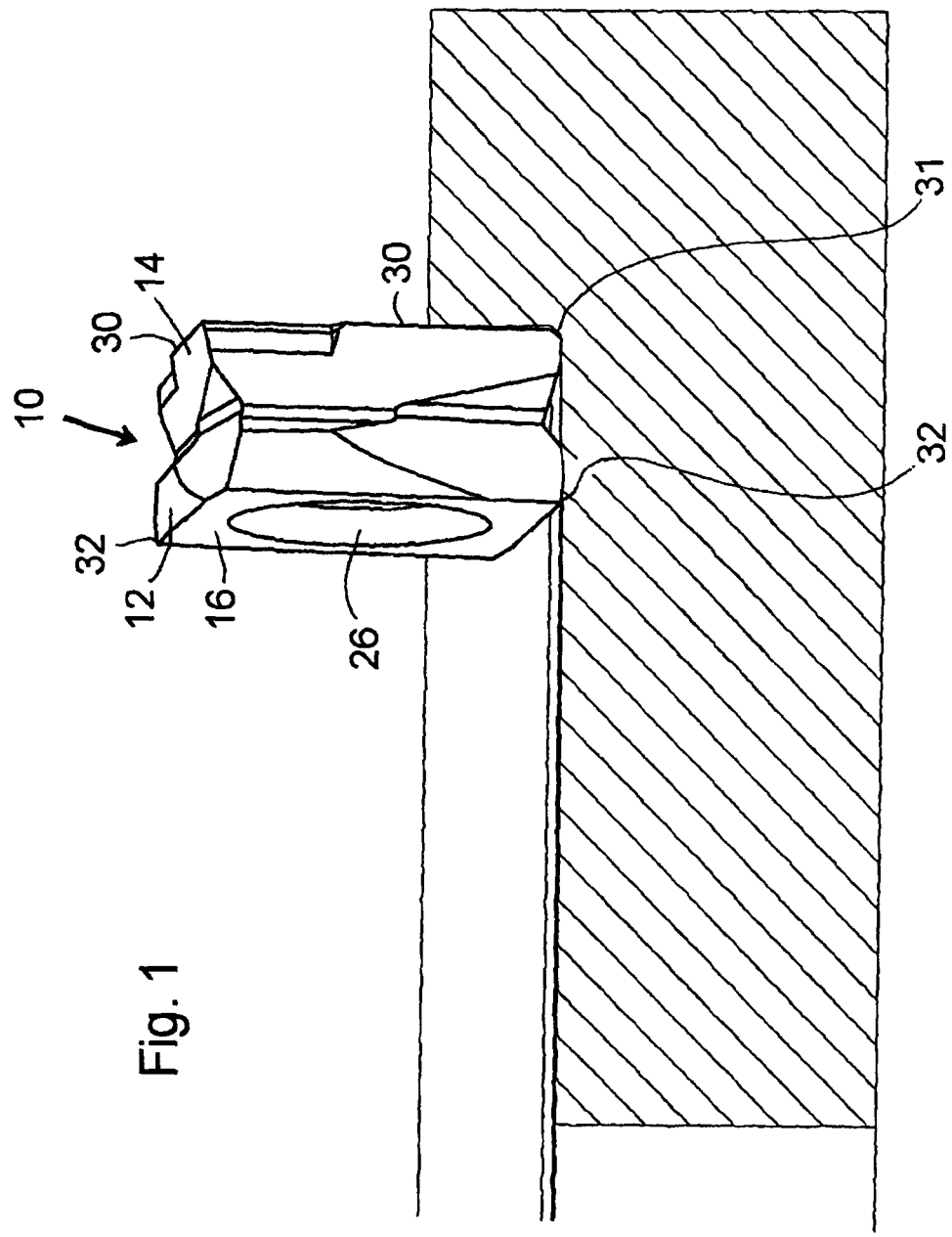
FIG. 1 is a perspective view of an indexable insert acting upon a workpiece.

The figures show at least one possible embodiment of an indexable cutting insert 10 composed of two partial bodies 12, 14. Each partial body 12, 14 has a square base 16 and in general the shape of a truncated pyramid. The two partial bodies 12, 14 are put together at the top surfaces of the truncated pyramids, i.e. at the smaller surfaces opposite the bases 16.

Each partial body 12, 14 has four side faces 18, 20, 22, 24, extending from the respective base 16 up to the other partial body. Each side face can be composed of several smaller partial surfaces.

It should be mentioned that the term "truncated pyramid" is not to be understood here in the mathematical sense, but just indicates that the side faces 18, 20, 22, 24 slightly converge. In other words, the indexable insert is somewhat contracted in the middle between the two bases 16. It should also be mentioned that the two partial bodies 12, 14 do not necessarily merge into one another by means of a defined edge, but that a transition section can be provided between the two partial bodies, for example in the manner of a groove.

Figure 2:
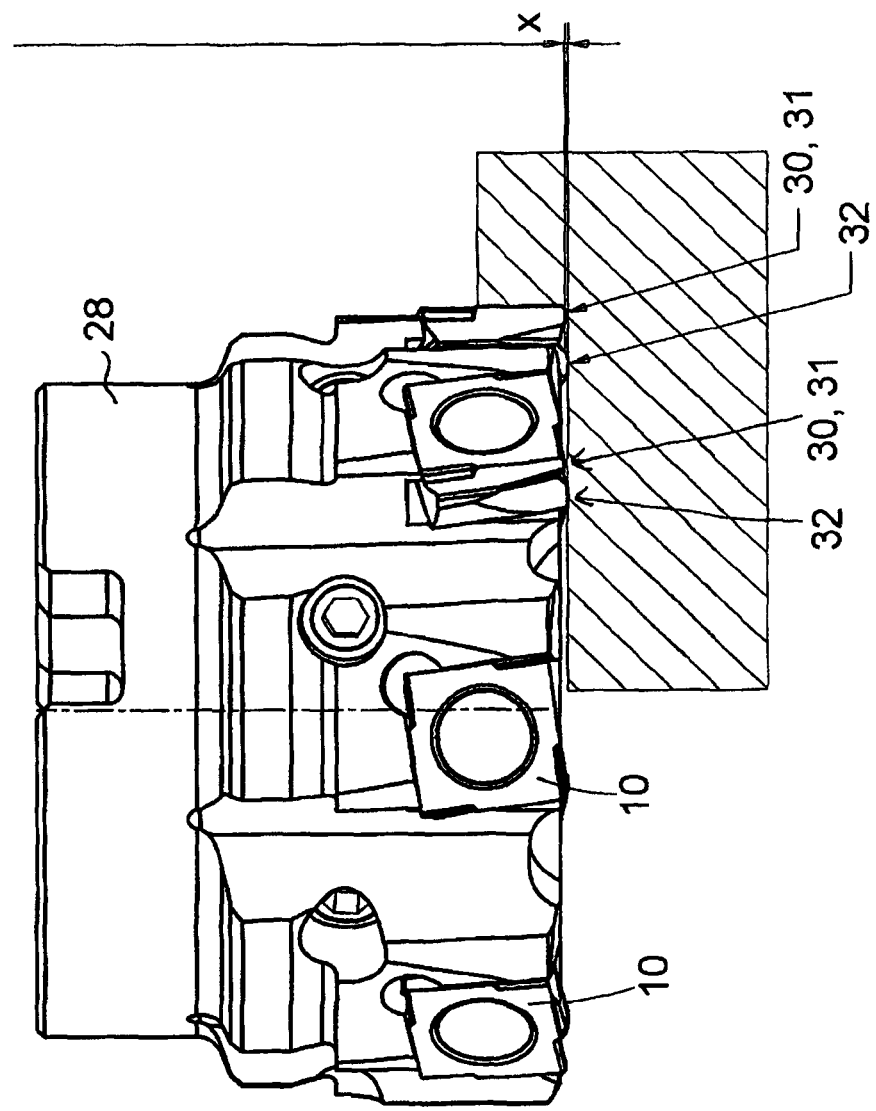
FIG. 2 is a side view of a milling cutter with a number of indexable inserts according to FIG. 1, acting upon a workpiece.
Figure 4:
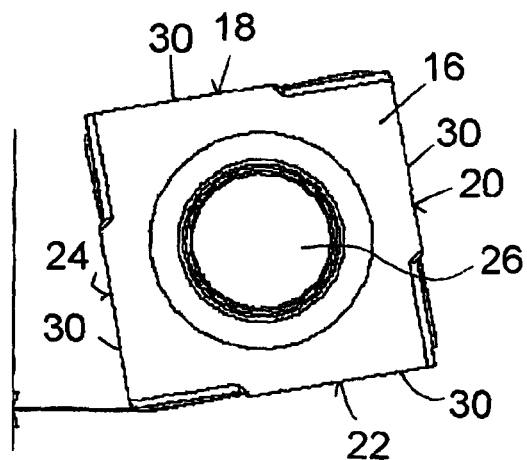
FIG. 4 is a side view of the indexable insert of FIG. 3.

An opening 26 extends centrically through the indexable insert, the center line of said opening 26 being perpendicular to the bases 16 of the indexable insert. A fastening element can be passed through the opening 26 to fasten the indexable insert on a holder, such as a milling cutter 28 (see FIG. 2).

In at least one possible embodiment of the indexable insert, the two partial bodies 12, 14 are rotated toward one another, namely about an axis extending perpendicularly to the bases 16 and centrally through the two partial bodies 12, 14. In the exemplary embodiment illustrated, this axis coincides with the center line of the opening 26. In the exemplary embodiment illustrated, the partial body 12 is rotated clockwise relative to the partial body 14, so that, with reference to FIG. 1, the "front bottom" corner of the partial body 12 is situated lower than the "front bottom" corner of the partial body 14.

On one of the partial bodies, in this case on the partial body 14, four roughing edges 30 are formed and on the other partial body, in this case on the partial body 12, four finishing edges 32 are formed.

Figure 3:
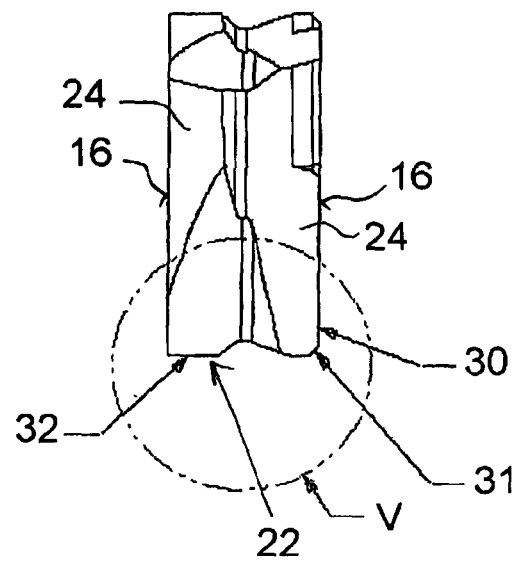
FIG. 3 is a front view of the indexable insert of FIG. 1.
Figure 5:
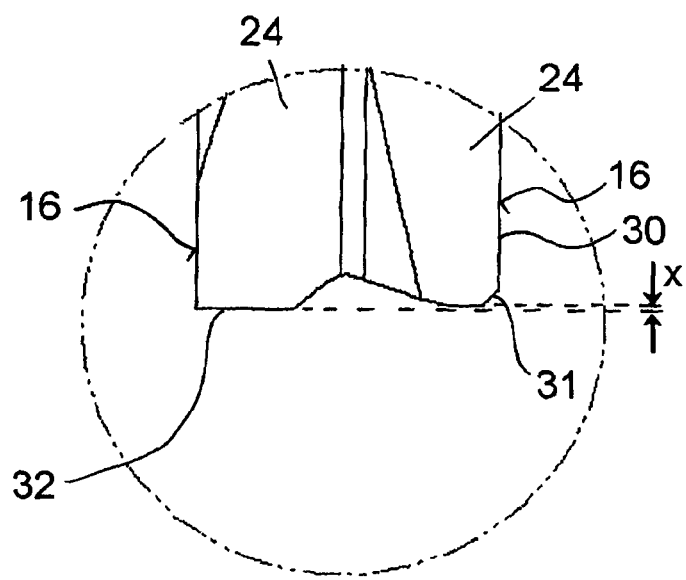
FIG. 5 is an enlarged view of the detail V of FIG. 3.

Each roughing edge 30 is formed by the edge between the base 16 of the partial body 14 and one of the side faces 18, 20, 22, 24. As can be seen in FIGS. 3 and 5, the touching edge between two side faces can be designed in such a manner that it acts as the continuation of the corresponding roughing edge 30. This continuation of the roughing edge 30 can be designed as a corner radius or single or double corner chamfer 32 or also as a combination thereof.

Each finishing edge 32 is formed at the intersection between two of the side faces 18, 20, 22, 24 of the partial body 12, so that the finishing edges extend approximately perpendicularly to the roughing edges.

In at least one possible embodiment, it is an essential feature that due to the rotation of the two partial bodies 12, 14 relative to one another, one of the two cutting edges, i.e. a roughing edge 30, 31 and a finishing edge 32, which are active at a given orientation of the indexable insert, protrudes farther toward the workpiece than the other. As can be seen in particular in FIGS. 1 and 5, the finishing edge 32 protrudes farther toward the workpiece than roughing edge 30, 31. This difference x may lie in the range of 0.01 to 0.1 mm, or possibly 0.02 to 0.04 mm. In this way, the roughing edge 30, 31 is responsible for the largest part of material removal, while the fine machining is carried out by the finishing edge 32, which has to remove a correspondingly small amount of material.

Figure 3A:
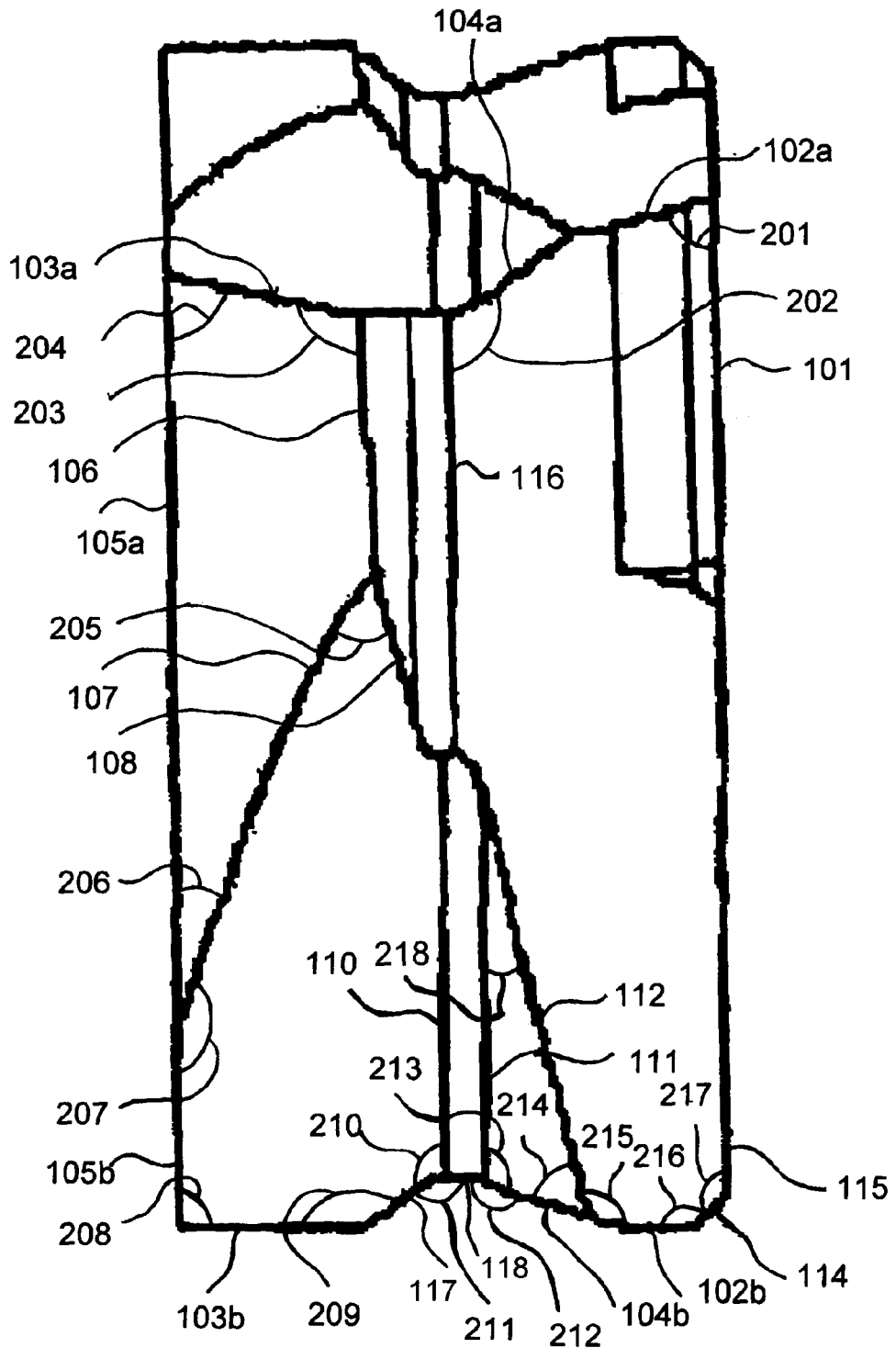
FIG. 3A is close up of the front view of the indexable insert of FIG. 3.

FIG. 3A shows another view of the indexable insert with exemplary measurements of angles formed between two edges or surfaces. For example, edges or surfaces 101 and 102 define or enclose an angle 201 of approximately 75 degrees. It should be understood that the measured angles are exemplary and could be modified as desired in degrees or tenths of a degree or even hundredths of a degree. For example, edges or surfaces 101 and 102 could be positioned differently to define or enclose a different angle 201 of 65, 66, 67, 68, 69, 70, 71, 72, 73, 74, 75, 76, 77, 78, 79, 80, 81, 82, 83, 84, or 85 degrees, or values in tenths of a degree there between, such as 71.6 or 84.1 degrees, or even hundredths of a degree, such as 66.24 or 78.93 degrees. Edges 105a and 105b are upper and lower portions of an overall edge divided at the point where edge or surface 107 intersects between them. The following is a table of the edges or surfaces and the angles that they enclose or define. As stated above, the angle measurements are for exemplary purposes and could be altered as desired in at least one possible embodiment.

| Pair of edges or surfaces | Angle no. and measurement |
| --- | --- |
| 101, 102a | 201-75° |
| 104a, 116 | 202-130° |
| 103a, 106 | 203-75° |
| 103a, 105a | 204-75° |
| 107, 108 | 205-35° |
| 105a, 107 | 206-15° |
| 105b, 107 | 207-165° |
| 103b, 105b | 208-90° |
| 103b, 117 | 209-145° |
| 117, 110 | 210-130° |
| 117, 118 | 211-145° |
| 104b, 118 | 212-165° |
| 104b, 111 | 213-115° |
| 104b, 112 | 214-55° |
| 104b, 102b | 215-125° |
| 102b, 114 | 216-140° |
| 114, 115 | 217-145° |
| 111, 112 | 218-10° |

Figure 3B:
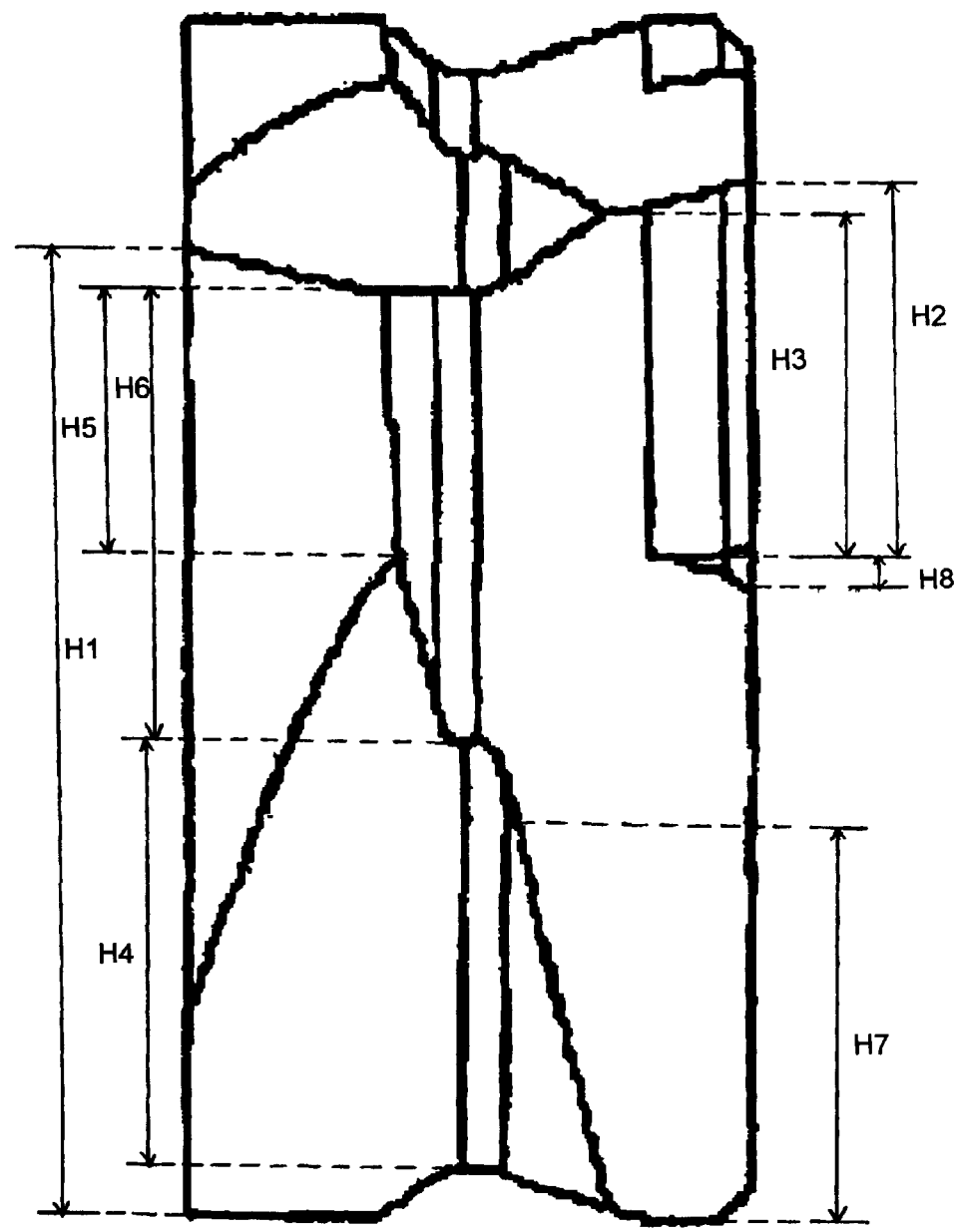
FIG. 3B is a close up of the front view of the indexable insert of FIG. 3.

FIG. 3B shows percentage measurements of the heights or lengths of several portions or sections of the front face of the cutting insert as shown in FIG. 3. H2 is 39 percent of H1. H3 is 37 percent of H1. H4 is 44 percent of H1. H5 is 28 percent of H1. H6 is 48 percent of H1. H7 is 43 percent of H1. H8 is 2 percent of H1. It should be understood that the measured percentages are exemplary and could be modified as desired in percents or tenths of a percent or even hundredths of a percent. For example, the lengths of H4 and/or H1 could be modified such that the length of H4 is a different percentage of the length of H1, such as anyone of 35, 36, 37, 38, 39, 40, 41, 42, 43, 44, 45, 46, 47, 48, 49, 50, 51, 52, 53, 54, or 55 percent, or values in tenths of a percent there between, such as 49.1 or 53.2 percent, or even hundredths of a percent, such as 38.57 or 42.19 percent.

FIG. 6 shows additional three-dimensional views of the indexable insert according to at least one possible embodiment. The first view (starting counterclockwise from the upper left) shows a representation of how the indexable insert cuts into a workpiece. As can be seen in FIG. 6, the outer portion of the insert, as it would be positioned in a milling cutter such as the one shown in FIG. 2, performs a rough or roughing cut which leaves behind a rough or roughing surface. The inner portion of the insert substantially simultaneously performs a smoothing or finishing cut adjacent the roughing cut in order to quickly and efficiently cut a workpiece with a smooth finish. As can be seen further in the first view, there is a vertical space between the two points A and B on the roughing and smoothing portions, respectively, which space may be approximately 0.02 mm to 0.04 mm, but also could be any number in tenths or hundredths of a millimeter there between, or could be any such number within the range of 0.01 mm to 0.1 mm. This vertical spacing is such that after the outer, roughing portion completes its rough cut and removes most all of the material, only a small portion of material is left behind which is only as thick or as tall as the vertical spacing. Thus, the inner, finishing portion only has to remove very little material with a thickness or height of equal to or less than 0.1 mm. The other two views shown in FIG. 6 simply show three dimensional views of the various surfaces and edges of the cutting insert.

One feature or aspect of an embodiment is believed at the time of the filing of this patent application to possibly reside broadly in an indexable insert (10) with two partial bodies (12, 14), which merge into one another and which have a polygonal base, but are rotated toward one another, characterized in that one partial body (14) has a number of roughing edges (30, 31) and the other partial body (12), a number of finishing edges (32), which are arranged in such a manner that a roughing edge (30, 31) of a partial body (14) and a finishing edge (32) of the other partial body (12) can simultaneously act upon a workpiece.

Another feature or aspect of an embodiment is believed at the time of the filing of this patent application to possibly reside broadly in an indexable insert characterized in that the base (16) is an n-angled surface.

Yet another feature or aspect of an embodiment is believed at the time of the filing of this patent application to possibly reside broadly in an indexable insert characterized in that the base (16) is square.

Still another feature or aspect of an embodiment is believed at the time of the filing of this patent application to possibly reside broadly in an indexable insert characterized in that each partial body (12, 14) has in general the shape of a truncated pyramid, the two truncated pyramids merging into one another at their top surfaces.

A further feature or aspect of an embodiment is believed at the time of the filing of this patent application to possibly reside broadly in an indexable insert characterized in that the roughing edges (30, 31) are formed by the intersection line between a base (16) of a partial body (12, 14) and a side face (18, 20, 22, 24).

Another feature or aspect of an embodiment is believed at the time of the filing of this patent application to possibly reside broadly in an indexable insert characterized in that the roughing edges are extended by the intersection line (31) between two adjacent side faces (18, 20, 22, 24).

Yet another feature or aspect of an embodiment is believed at the time of the filing of this patent application to possibly reside broadly in an indexable insert characterized in that the intersection line (31) between two adjacent side faces acting as a roughing edge is designed as a corner radius (31), single corner chamfer (31) or double corner chamfer.

Still another feature or aspect of an embodiment is believed at the time of the filing of this patent application to possibly reside broadly in an indexable insert characterized in that the intersection line (31) between two adjacent side faces acting as a roughing edge is designed as a combination of corner radius (31), single corner chamfer (31) and/or double corner chamfer.

A further feature or aspect of an embodiment is believed at the time of the filing of this patent application to possibly reside broadly in an indexable insert characterized in that the finishing edge (32) is curved.

Another feature or aspect of an embodiment is believed at the time of the filing of this patent application to possibly reside broadly in an indexable insert characterized in that the finishing edge (32) is straight.

Yet another feature or aspect of an embodiment is believed at the time of the filing of this patent application to possibly reside broadly in an indexable insert characterized in that in the working position of the indexable insert (10), the finishing edge (32) protrudes outwards over the roughing edge (30, 31) by 0.01 to 0.1 mm.

One feature or aspect of an embodiment is believed at the time of the filing of this patent application to possibly reside broadly in a rotary milling cutter comprising: a shaft having a central, rotational axis; a tool head having a central, rotational axis being disposed substantially coaxially to said central, rotational axis of said shaft; said shaft being connected to said tool head to drive and rotate said tool head; said tool head comprising an end face disposed opposite said shaft; said tool head comprising a peripheral side surface being disposed about the periphery of and to extend substantially axially away from said end face toward said shaft; a plurality of indexable inserts being connected to and disposed on and about the peripheral side surface of said tool head; each of said indexable inserts comprising a first body and a second body which merge into one another and which have a polygonal base and are rotated toward one another; said first body comprising a plurality of roughing edges for rough machining of a workpiece; said second body comprising a plurality of finishing edges for finish or smooth machining of a workpiece; each of said indexable inserts being positioned on said peripheral side surface such that said base or face of said first body faces away from said tool head and said base or face of said second body faces toward said tool head to permit a roughing edge of said first body and a finishing edge of said second body to simultaneously cut a workpiece.

Another feature or aspect of an embodiment is believed at the time of the filing of this patent application to possibly reside broadly in a method of machining a workpiece using a rotary milling cutter comprising: a shaft having a central, rotational axis; a tool head having a central, rotational axis being disposed substantially coaxially to said central, rotational axis of said shaft; said shaft being connected to said tool head to drive and rotate said tool head; said tool head comprising an end face disposed opposite said shaft; said tool head comprising a peripheral side surface being disposed about the periphery of and to extend substantially axially away from said end face toward said shaft; a plurality of indexable inserts being connected to and disposed on and about the peripheral side surface of said tool head; each of said indexable inserts comprising a first body and a second body which merge into one another and which have a polygonal base and are rotated toward one another; said first body comprising a plurality of roughing edges for rough machining of a workpiece; said second body comprising a plurality of finishing edges for finish or smooth machining of a workpiece; each of said indexable inserts being positioned on said peripheral side surface such that said base or face of said first body faces away from said tool head and said base or face of said second body faces toward said tool head to permit a roughing edge of said first body and a finishing edge of said second body to simultaneously cut a workpiece; said method comprising the steps of: rotating said tool head with said shaft; engaging and rough cutting a workpiece with a rough cutting edge of said first body and removing a substantial amount of material from said workpiece; engaging and finish cutting a rough-cut surface of the workpiece with a finishing edge of said second body and removing a substantially smaller amount of material from said workpiece than the amount removed by said rough cutting; and substantially simultaneously engaging said workpiece with both said rough cutting edge and said finishing edge to both rough cut and finish cut a workpiece in a single cutting step.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in anyone or more embodiments of the application.

The sentence immediately above relates to patents, published patent applications and other documents either incorporated by reference or not incorporated by reference.

All of the patents, patent applications or patent publications, which were cited in the INTERNATIONAL SEARCH REPORT dated May 4, 2007, and/or cited elsewhere are hereby incorporated by reference as if set forth in their entirety herein as follows: U.S. Pat. No. 4,539,875 A (LEE MINYOUNG [US] ET AL) 10 Sep. 1985, EP 0 313 534 A2 (SECO TOOLS AB [SE]) 26 Apr. 1989, U.S. Pat. No. 3,490, 117 A (HERTEL KARL) 20 Jan. 1970, DE 203 13 042 U1 (DEPO FRAESTECHNIK GMBH & CO KG [DE] 23 Oct. 2003.

The corresponding foreign and international patent publication applications, namely, Federal Republic of Germany Patent Application No. 10 2005 054 434.7, filed on Nov. 15, 2005, having inventor Konrad SPITZENBERGER, and DE-OS 10 2005 054 434.7 and DE-PS 10 2005 054 434.7, and International Application No. PCT/EP2006/010696, filed on Nov. 8, 2006, having WIPO Publication No. WO 2007/057113 and inventor Konrad SPITZENBERGER, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A method of machining a workpiece using a rotary milling cutter comprising: a shaft having a central, rotational axis; a tool head having a central, rotational axis being disposed coaxially to said central, rotational axis of said shaft; said shaft being connected to said tool head to drive and rotate said tool head; said tool head comprising an end face disposed opposite said shaft; said tool head comprising a peripheral side surface being disposed about the periphery of and to extend axially away from said end face toward said shaft; a plurality of indexable inserts mounted on the peripheral side surface of said tool head; each of said indexable inserts comprising a first partial body and a second partial body, each partial body having a general shape of a truncated pyramid with a polygonal base and a top surface; said first partial body comprising a plurality of roughing edges for rough machining of a workpiece; said second partial body comprising a plurality of finishing edges for finish or smooth machining of a workpiece; said first and second partial bodies joined together at the top surface of their respective truncated pyramids and rotated relative to one another about a central axis of the indexable insert in such a way that one of the plurality of finishing edges of the second partial body is located axially farther from the end face of the tool head in a direction extending parallel to the central, rotation axis of the tool head and toward the workpiece when positioned for machining than one of the plurality of roughing edges of the first partial body when positioned for machining; each of said indexable inserts being positioned on said peripheral side surface in such a way that said polygonal base of said first partial body faces away from said tool head and said polygonal base of said second partial body faces toward said tool head to enable one of the plurality of roughing edges of said first partial body and one of the plurality of finishing edges of said second partial body to engage the workpiece;

said method comprising the steps of:

rotating said tool head with said shaft;

rough cutting said workpiece with one of the plurality of roughing edges of said first partial body to remove a first amount of material from said workpiece; and finish cutting a rough-cut surface of the workpiece with one of the plurality of finishing edges of said second partial body to remove a second amount of material from said workpiece, said second amount of material being smaller than the first amount of material removed by said rough cutting step, whereby both one of the plurality of roughing edges of said first partial body and one of the plurality of finishing edges of said second partial body simultaneously engage said workpiece to perform both said rough cutting step and said finish cutting step of said workpiece in a single cutting operation.

2. The method of machining a workpiece using a milling cutter according to claim 1, wherein the one of the plurality of finishing edges of the second partial body that is positioned for machining is located axially farther from the end face of the tool head than the one of the plurality of roughing edges of the first partial body that is also positioned for machining by a distance of 0.01 mm to 0.1 mm.

3. The method of machining a workpiece using a milling cutter according to claim 1, wherein:

the polygonal base of each of the first and second partial bodies is substantially square.

4. The method of machining a workpiece using a milling cutter according to claim 1, wherein the first partial body includes a plurality of side faces, and wherein the plurality of roughing edges are formed at an intersection between the polygonal base and the plurality of side faces of said first partial body.

5. The method of machining a workpiece using a milling cutter according to claim 1, wherein the second partial body includes a plurality of side faces, and wherein the plurality of finishing edges are formed at an intersection between the polygonal base and the plurality of side faces of said second partial body; and wherein the plurality of finishing edges are substantially perpendicular to the plurality of roughing edges.

* * * * *